US007264855B2

(12) United States Patent
Bourdelais et al.

(10) Patent No.: US 7,264,855 B2
(45) Date of Patent: *Sep. 4, 2007

(54) IMAGING MEMBER WITH VACUOUS CORE BASE

(75) Inventors: Robert P. Bourdelais, Pittsford, NY (US); Thomas M. Laney, Spencerport, NY (US); Peter T. Aylward, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 222 days.

This patent is subject to a terminal disclaimer.

(21) Appl. No.: 10/255,918

(22) Filed: Sep. 26, 2002

(65) Prior Publication Data

US 2004/0062901 A1 Apr. 1, 2004

(51) Int. Cl.
*B32B 3/26* (2006.01)

(52) U.S. Cl. ............................... 428/32.17; 428/315.5; 428/315.7; 428/315.9; 428/32.18; 428/32.2

(58) Field of Classification Search ............. 428/315.5, 428/315.7, 315.9, 32.17, 32.18, 32.2
See application file for complete search history.

(56) References Cited

U.S. PATENT DOCUMENTS

| | | | | |
|---|---|---|---|---|
| 5,853,965 | A | 12/1998 | Haydock et al. | |
| 5,866,282 | A | 2/1999 | Bourdelais et al. | |
| 5,888,681 | A | 3/1999 | Gula et al. | |
| 5,935,690 | A | 8/1999 | Aylward et al. | |
| 5,998,119 | A | 12/1999 | Aylward et al. | |
| 6,043,009 | A | 3/2000 | Bourdelais et al. | |
| 6,048,606 | A | 4/2000 | Bourdelais et al. | |
| 6,083,669 | A | 7/2000 | Bourdelais et al. | |
| 6,093,521 | A | 7/2000 | Laney et al. | |
| 6,130,024 | A * | 10/2000 | Aylward et al. | 430/256 |
| 6,187,523 | B1 | 2/2001 | Aylward et al. | |
| 6,218,059 | B1 | 4/2001 | Aylward et al. | |
| 6,261,994 | B1 | 7/2001 | Bourdelais et al. | |
| 6,270,950 | B1 | 8/2001 | Bourdelais et al. | |

FOREIGN PATENT DOCUMENTS

| | | |
|---|---|---|
| EP | 0 582 750 A1 | 2/1994 |
| GB | 1 563 591 | 3/1980 |
| WO | WO94/04961 | 3/1994 |
| WO | WO9612766 A1 * | 5/1996 |

* cited by examiner

*Primary Examiner*—Elizabeth M. Cole
(74) *Attorney, Agent, or Firm*—Arthur E. Kluegel

(57) ABSTRACT

The invention relates to an imaging member comprising an image layer and a base material wherein said base material comprises at least one oriented sheet laminated to a core sheet comprising a vacuous composite of polyolefin and polyester having a density of less than 0.7 g/cc.

19 Claims, No Drawings

IMAGING MEMBER WITH VACUOUS CORE BASE

FIELD OF THE INVENTION

This invention relates to photographic materials. In a preferred form it relates to base materials for photographic reflection display.

BACKGROUND OF THE INVENTION

It is known in the art that photographic display materials are utilized for advertising, as well as decorative displays of photographic images. Since these display materials are used in advertising, the image quality of the display material is critical in expressing the quality message of the product or service being advertised. Further, a photographic display image needs to be high impact, as it attempts to draw consumer attention to the display material and the desired message being conveyed. Typical applications for display material include product and service advertising in public places such as airports, buses and sports stadiums, movie posters, and fine art photography. The desired attributes of a quality, high impact photographic display material are a slight blue density minimum, durability, sharpness, and flatness. Cost is also important, as display materials tend to be expensive compared with alternative display material technology, mainly lithographic images on paper. For display materials, traditional color paper is undesirable, as it suffers from a lack of durability for the handling, photographic processing, and display of large format images.

In the formation of color paper it is known that the base paper has applied thereto a layer of polymer, typically polyethylene. This layer serves to provide waterproofing to the paper, as well as providing a smooth surface on which the photosensitive layers are formed. The formation of a suitably smooth surface is difficult requiring great care and expense to ensure proper laydown and cooling of the polyethylene layers. The formation of a suitably smooth surface would also improve image quality as the display material would have more apparent blackness as the reflective properties of the improved base are more specular than the prior materials. As the whites are whiter and the blacks are blacker, there is more range in between and, therefore, contrast is enhanced. It would be desirable if a more reliable and improved surface could be formed at less expense.

Prior art photographic reflective papers comprise a melt extruded polyethylene layer which also serves as a carrier layer for optical brightener and other whitener materials as well as tint materials. It would be desirable if the optical brightener, whitener materials and tints, rather than being dispersed throughout the single layer of polyethylene could be concentrated nearer the surface of the layer where they would be more effective optically.

Prior art photographic reflective display materials have light sensitive silver halide emulsions coated directly onto a gelatin coated opacified polyester base sheet. Since the emulsion does not contain any materials to opacity the imaging element, white pigments such as $BaSO_4$ have been added to the polyester base sheet to provide a imaging element with both opacity and the desired reflection properties. Also, optical brightener is added to the polyester base sheet to give the sheet a blue tint in the presence of a ultraviolet light source. The addition of the white pigments into the polyester sheet causes several manufacturing problems which can either reduce manufacturing efficiency or reduce image quality. The addition of white pigment to the polyester base causes manufacturing problems such as die lines and pigment agglomeration which reduce the efficiency at which photographic display material can be manufactured. It would be desirable if the optical brightener, whitener materials and tints, rather than being dispersed throughout the polyester base sheet could be concentrated nearer the surface where they would be more effective optically and improve manufacturing efficiency.

Prior art reflective photographic materials with a polyester base use a $TiO_2$ pigmented polyester base onto which light sensitive silver halide emulsions are coated. It has been proposed in WO 94/04961 to use opaque polyester containing 10% to 25% $TiO_2$ for a photographic support. The $TiO_2$ in the polyester gives the reflective display materials an undesirable opulence appearance. The $TiO_2$ pigmented polyester also is expensive because the $TiO_2$ must be dispersed into the entire thickness, typically from 100 to 180 μm. The also gives the polyester support a slight yellow tint which is undesirable for a photographic display material. For use as a photographic display material, the polyester support containing $TiO_2$ must be tinted blue to offset the yellow tint of the polyester causing a loss in desirable whiteness and adding cost to the display material. It would be desirable if a reflective display support did not contain any $TiO_2$ in the base and $TiO_2$ could be concentrated near the light sensitive emulsion.

Prior art photographic display material use polyester as a base for the support. Typically the polyester support is from 150 to 250 μm thick to provide the required stiffness. A thinner base material would be lower in cost and allow for roll handling efficiency as the rolls would weigh less and be smaller in diameter. It would be desirable to use a base material that had the required stiffness but was thinner to reduce cost and improve roll handling efficiency.

In U.S. Pat. Nos. 6,270,950; 6,261,994; 6,093,521 and 6,083,669 the use of a voided polyester base material for imaging support materials is disclosed. The voided polyester disclosed is created utilizing polymer beads that cause voiding when the polyester sheet containing the polymer beads is oriented. The voiding generally is circular in shape and reduces the density of the polyester between 5 and 20%.

Prior art photographic bases are also know to contain oriented white reflective films that are adhesively adhered to a base substrate such as paper or plastic such as polyester. Such bases are coated with light sensitive silver halide photographic layers or with image receiving layers such as inkjet, thermal dye transfer and others. Typical imaging supports are disclosed in U.S. Pat. Nos. 5,866,282; 5,853,965; 5,888,681; 5,998,119; 6,043,009 and 6,218,059.

PROBLEM TO BE SOLVED BY THE INVENTION

There is a need for a reflective display material having a whiter appearance. There is also a need for reflective display materials that have a wider color gamut, lower cost and lower weight.

SUMMARY OF THE INVENTION

It is an object of the invention to overcome disadvantages of prior display materials.

It is another object to provide reflective display materials having a wider contrast range.

It is a further object to provide lower cost, high quality reflective display materials.

It is another object to provide lower weight display matterials.

These and other objects of the invention are accomplished by an image layer and a base material wherein said base material comprises at least one oriented sheet laminated to a core sheet comprising a vacuous composite of polyolefin and polyester having a density of less than 0.7 g/cc.

ADVANTAGEOUS EFFECT OF THE INVENTION

The invention provides improved display materials that provide whiter whites. The reflective display materials further provide a wider color variation and sharper images. The invention materials are lower in cost.

DETAILED DESCRIPTION OF THE INVENTION

The invention has numerous advantages over prior practices in the art. The invention has numerous advantages over prior photographic and imaging members. The members of the invention are lighter in weight so that mailing cost may be reduced. The highly voided base material significantly reduces the weight of the imaging element reducing mailing and handling costs that are typical of images that are printed in centralized locations and mailed to consumers. Additionally the imaging member of this invention are more opaque and have much less show through than conventional imaging members.

The reflective display material of the invention has a whiter white than prior materials. Prior materials were somewhat yellow and had a higher minimum density as there was a large quantity of white pigment in the polymer base sheet. Typically when a large quantity of white $TiO_2$ is loaded into a transparent polymer sheet, it becomes somewhat yellowish rather than being the desired neutral reflective white. The prior art base sheet containing white pigment was required to be quite thick, both to carry the high amount of white pigment, as well as to provide the stiffness required for display materials. It has surprisingly been found that a thinner transparent polymer sheet laminated with a thin biaxially oriented polyolefin sheet has sufficient stiffness for use as a display material, as well as having superior reflective properties. The ability to use less polymer in the transparent polymer sheet results in a cost savings. The display material of the invention provides sharper images as they have higher accutance due to the efficient reflective layer on the upper surface of the biaxially oriented polyolefin sheet. There is a visual contrast improvement in the display material of the invention as the lower density is lower than prior product and the upper amount of density has been visually increased. The display material has a more maximum black as the reflective properties of the improved base are more specular than the prior materials. As the whites are whiter and the blacks are blacker, there is more range in between and, therefore, contrast is enhanced. These and other advantages will be apparent from the detailed description below.

The terms as used herein, "top", "upper", "emulsion side", and "face" mean the side or toward the side of the photographic member bearing the imaging layers. The terms "bottom", "lower side", and "back" mean the side or toward the side of the photographic member opposite from the side bearing the photosensitive imaging layers or developed image. The term as used herein, "transparent" means the ability to pass radiation without significant deviation or absorption. The term "vacuous" in vacuous material or vacuous composite or vacuous layer means a material with voids of such volume that the gaseous phase in the layer or material or composite is greater than 50% of the total volume for the layer, material or composite. For this invention, "transparent" material is defined as a material that has a spectral transmission greater than 90%. For a photographic element, spectral transmission is the ratio of the transmitted power to the incident power and is expressed as a percentage as follows; $T_{RGB}=10^{-D}*100$ where D is the average of the red, green and blue Status A transmission density response measured by an X-Rite model 310 (or comparable) photographic transmission densitometer.

The term used herein "modulus to density ratio" is a ratio of the machine direction Young's modulus divided by the sample density. This measurement is done by determining the stress-strain curve of the vacuous polymer base. The tensile properties are measured using a Sintech tensile tester with a 136.4 kilogram load cell. The test conditions are 5.1 cm/min. initial jaw separation speed and 10.2 cm nominal gage length. The sample width was 15 mm.

As used herein the term "L*" is a measure of how light or dark a color is. The CIELAB metrics, a*, b*, and L*, when specified in combination, describe the color of an object, (under fixed viewing conditions, etc). The measurement of a*, b*, and L* are well documented and now represent an international standard of color measurement. (The well-known CIE system of color measurement was established by the International Commission on Illumination in 1931 and was further revised in 1971. For a more complete description of color measurement, refer to "Principles of Color Technology, 2nd Edition by F. Billmeyer, Jr. and M. Saltzman, published by J. Wiley and Sons, 1981).

L* is a measure of how light or dark a color is. L*=100 is white. L*=0 is black. The value of L* is a function of the Tristimulus value Y, thus $$L^*=116(Y/Y_n)^{1/3}-16$$

Simply stated, a* is a measure of how green or magenta the color is (since they are color opposites), and b* is a measure of how blue or yellow a color is. From a mathematical perspective, a* and b* are determined as follows:

$$a^*=500\{(X/X_n)^{1/3}-(Y/Y_n)^{1/3}\}$$

$$b^*=200\{(Y/Y_n)^{1/3}-(Z/Z_n)^{1/3}\}$$

where X, Y and Z are the Tristimulus values obtained from the combination of the visible reflectance spectrum of the object, the illuminant source (i.e. 5000° K), and the standard observer function.

The a* and b* functions determined above may also be used to better define the color of an object. By calculating the arctangent of the ratio of b*/a*, the hue-angle of the specific color can be stated in degrees.

$$h_{ab}=\arctan(b^*/a^*)$$

Biaxially oriented sheets adhered to the vacuous core of the invention provide increased stiffness, a smooth surface for application of the imaging layers and provide concentrated addenda for optimization of image quality. Biaxially oriented polyolefin sheets are preferred for the sheet on the top side of the laminated base of the invention. Microvoided composite biaxially oriented sheets are preferred because the voids provide opacity without the use of $TiO_2$. Microvoided composite oriented sheets are conveniently manufactured by coextrusion of the core and surface layers, followed by biaxial orientation, whereby voids are formed around void-initiating material contained in the core layer. Such composite sheets are disclosed in, for example, U.S. Pat. Nos. 4,377,616; 4,758,462 and 4,632,869.

The core of the preferred composite sheet adhered to the vacuous core the total thickness of the sheet, preferably from 30 to 85% of the total thickness. The nonvoided skin(s) should thus be from 5 to 85% of the sheet, preferably from 15 to 70% of the thickness.

The density (specific gravity) of the composite sheet, expressed in terms of "percent of solid density" is calculated as follows:

$$\frac{\text{Composite Sheet Density}}{\text{Polymer Density}} \times 100 = \%\ \text{of Solid Density}$$

should be between 45% and 100%, preferably between 67% and 100%. As the percent solid density becomes less than 67%, the composite sheet becomes less manufacturable due to a drop in tensile strength and it becomes more susceptible to physical damage.

The total thickness of the composite sheet adhered to the vacuous core from 12 to 100 micrometers, preferably from 20 to 70 micrometers. Below 20 micrometers, the microvoided sheets may not be thick enough to minimize any inherent non-planarity in the support and would be more difficult to manufacture. At thickness higher than 70 micrometers, little improvement in either surface smoothness or mechanical properties are seen, and so there is little justification for the further increase in cost for extra materials.

"Void" is used herein to mean devoid of added solid and liquid matter, although it is likely the "voids" contain gas. The void-initiating particles of the composite sheet adhered to the vacuous core which remain in the finished sheet should be from 0.1 to 10 micrometers in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The void-initiating material of the composite sheet adhered to the vacuous core may be selected from a variety of materials, and should be present in an amount of about 5-50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is pre-shaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula $Ar—C(R)═CH_2$, wherein Ar represents an aromatic hydrocarbon radical, or an aromatic halohydrocarbon radical of the benzene series and R is hydrogen or the methyl radical; acrylate-type monomers include monomers of the formula $CH_2═C(R')—C(O)(OR)$ wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula $CH_2═CH(O)COR$, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2-10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate and mixtures thereof.

Examples of typical monomers for making the crosslinked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethylpropane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with a agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles of the composite sheet adhered to the vacuous core can also be inorganic spheres, including solid or hollow glass spheres, metal or ceramic beads or inorganic particles such as clay, talc, barium sulfate, calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin film is utilized.

For the biaxially oriented sheets on the vacuous polymer base toward the emulsion, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polypropylene is preferred, as it is low in cost and has desirable strength properties.

The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

The total thickness of the top most skin layer or exposed surface layer should be between 0.20 micrometers and 1.5 micrometers, preferably between 0.5 and 1.0 micrometers. Below 0.5 micrometers any inherent non-planarity in the coextruded skin layer may result in unacceptable color variation. At skin thickness greater than 1.0 micrometers, there is a reduction in the photographic optical properties such as image resolution. At thickness greater that 1.0 micrometers there is also a greater material volume to filter for contamination such as clumps, poor color pigment dispersion, or contamination.

Addenda may be added to the top most skin layer to change the color of the imaging element. For photographic use, a white base with a slight bluish tinge is preferred. The addition of the slight bluish tinge may be accomplished by any process which is known in the art including the machine blending of color concentrate prior to extrusion and the melt extrusion of blue colorants that have been pre-blended at the desired blend ratio. Colored pigments that can resist extrusion temperatures greater than 320° C. are preferred as temperatures greater than 320° C. are necessary for coextrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments, Irgalite organic blue pigments and pigment Blue 60.

One detail is that a very thin coating (0.2 to 1.5 micrometers) on the surface immediately below the emulsion layer can be made by coextrusion and subsequent stretching in the width and length direction. It has been found that this layer is, by nature, extremely accurate in thickness and can be used to provide all the color corrections which are usually distributed throughout the thickness of the sheet between the emulsion and the polymer base. This topmost layer is so efficient that the total colorants needed to provide a correction are less than one-half the amount needed if the colorants are dispersed throughout thickness. Colorants are often the cause of spot defects due to clumps and poor dispersions. Spot defects, which decrease the commercial value of images, are improved with this invention because less colorant is used and high quality filtration to clean up the colored layer is much more feasible since the total volume of polymer with colorant is only typically 2 to 10 percent of the total polymer between the base polymer and the photosensitive layer.

While the addition of $TiO_2$ in the thin skin layer of this invention does not significantly contribute to the optical performance of the sheet it can cause numerous manufacturing problems such as extrusion die lines and spots. The skin layer substantially free of $TiO_2$ is preferred. $TiO_2$ added to a layer between 0.20 and 1.5 micrometers does not substantially improve the optical properties of the support, will add cost to the design and will cause objectionable pigments lines in the extrusion process.

Addenda may be added to the biaxially oriented sheet adhered to the vacuous core of this invention so that when the biaxially oriented sheet is viewed from a surface, the imaging element emits light in the visible spectrum when exposed to ultraviolet radiation. Emission of light in the visible spectrum allows for the support to have a desired background color in the presence of ultraviolet energy. This is particularly useful when images are viewed under lighting that contains ultraviolet energy and may be used to optimize image quality for consumer and commercial applications.

Addenda known in the art to emit visible light in the blue spectrum are preferred. Consumers generally prefer a slight blue tint to white defined as a negative b* compared to a white white defined as a b* within one b* unit of zero. b* is the measure of yellow/blue in CIE space. A positive b* indicates yellow while a negative b* indicates blue. The addition of addenda that emits in the blue spectrum allows for tinting the support without the addition of colorants which would decrease the whiteness of the image. The preferred emission is between 1 and 5 delta b* units. Delta b* is defined as the b* difference measured when a sample is illuminated ultraviolet light source and a light source without any significant ultraviolet energy. Delta b* is the preferred measure to determine the net effect of adding an optical brightener to the top biaxially oriented sheet of this invention. Emissions less than 1 b* unit can not be noticed by most customers therefore is it not cost effective to add optical brightener to the biaxially oriented sheet. An emission greater that 5 b* units would interfere with the color balance of the prints making the whites appear too blue for most consumers.

The preferred addenda of this invention is an optical brightener. An optical brightener is colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis (O-Cyanostyryl) Benzol and 2-Amino-4-Methyl Phenol.

The optical brightener may be added to any layer in the multilayer coextruded biaxially oriented polyolefin sheet. The preferred locations are adjacent to or in the top most surface layer of the biaxially oriented sheet. This allows for the efficient concentration of optical brightener which results in less optical brightener being used when compared to traditional photographic supports. When the desired weight % loading of the optical brightener begins to approach the concentration at which the optical brightener migrates to the surface of the support forming crystals in the imaging layer, the addition of optical brightener into the layer adjacent to the exposed layer is preferred. When optical brigntner migration is a concern as with light sensitive silver halide imaging systems, the preferred exposed layer comprised polyethylene. In this case, the migration from the layer adjacent to the exposed layer is significantly reduced allowing for much higher optical brightener levels to be used to optimize image quality. Locating the optical brightener in the layer adjacent to the exposed layer allows for a less expensive optical brightener to be used as the exposed layer, which is substantially free of optical brightner, prevents significant migration of the optical brightener. Another preferred method to reduce unwanted optical brightner migration is to use polypropylene for the layer adjacent to the exposed surface. Since optical brightener is more soluble in polypropylene than polyethylene, the optical brightner is less likely to migrate from polypropylene.

A biaxially oriented sheet utilized with the vacuous invention material that has a microvoided core is preferred. The microvoided core adds opacity and whiteness to the imaging support further improving imaging quality. Combining the image quality advantages of a microvoided core with a material which absorbs ultraviolet energy and emits light in the visible spectrum allows for the unique optimization of image quality as the image support can have a tint when exposed to ultraviolet energy yet retain excellent whiteness when the image is viewed using lighting that does not contain high amounts of ultraviolet energy such as some types indoor lighting. The preferred number of voids in the vertical direction at substantially every point is greater than six. The number of voids in the vertical direction is the number of polymer/gas interfaces present in the voided layer. The voided layer functions as an opaque layer because of the index of refraction changes between polymer/gas interfaces. Greater than six voids is preferred because at 4 voids or less, little improvement in the opacity of the film is observed and thus does not justify the added expense to void the biaxially oriented sheet of this invention.

The biaxially oriented sheet utilized with the vacuous core may also contain pigments which are known to improve the photographic responses such as whiteness or sharpness. Titanium dioxide is used in this invention to improve image sharpness. The $TiO_2$ used may be either anatase or rutile type. In the case of optical properties, rutile is the preferred because of the unique particle size and geometry. Further, both anatase and rutile $TiO_2$ may be blended to improve both whiteness and sharpness. Examples of $TiO_2$ that are acceptable for a photographic system are Dupont Chemical Co. R101 rutile $TiO_2$ and DuPont Chemical Co. R104 rutile $TiO_2$. Other pigments to improve photographic responses may also be used in this invention such as titanium dioxide, barium sulfate, clay, or calcium carbonate. The preferred amount of $TiO_2$ added to the biaxially oriented sheet of this invention is between 18% and 24% by weight. Below 12% $TiO_2$, the required reflection density of the biaxially oriented sheet is difficult to obtain. Above 28% $TiO_2$, manufacturing efficiency declines because of problems extruding large amounts of $TiO_2$ compared with the base polymer. Examples of manufacturing problems include plate out on the screw, die manifold, die lips, extrusion screw wear and extrusion barrel life The preferred spectral transmission of the biaxially oriented polyolefin sheet of this invention is less than 15%. Spectral transmission is the amount of light energy that is transmitted through a material. For a photographic element, spectral transmission is the ratio of the transmitted power to the incident power and is expressed as a percentage as follows; $T_{RGB}=10^{-D}*100$ where D is the average of the red, green and blue Status A transmission density response measured by an X-Rite model 310 (or comparable) photographic transmission densitometer. The higher the transmission, the less opaque the material. For a reflective display material, the quality of the image is related to the amount of light reflected from the image to the observers eye. A reflective image with a high amount of spectral transmission does not allow sufficient light to reach the observers eye causing a perceptual loss in image quality. A reflective image with a spectral transmission of greater than 20% is unacceptable for a reflective display material as the quality of the image can not match prior art reflective display materials.

The coextrusion, quenching, orienting, and heat setting of these composite sheets used with the vacuous core may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. A stretching ratio, defined as the final length divided by the original length for sum of the machine and cross directions, of at least 10 to 1 is preferred. After the sheet has been stretched, it is heat set by heating to a temperature sufficient to crystallize or anneal the polymers while restraining to some degree the sheet against retraction in both directions of stretching.

The composite sheet, utilized with the vacuous core of the invention while described as having preferably at least three layers of a core and a skin layer on each side, may also be provided with additional layers that may serve to change the properties of the biaxially oriented sheet. Biaxially oriented sheets could be formed with surface layers that would provide an improved adhesion, or look to the support and photographic element. The biaxially oriented extrusion could be carried out with as many as 10 layers if desired to achieve some particular desired property.

These composite sheets utilized with the vacuous core of the invention may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability, coating polyvinylidene chloride for heat seal properties. Further examples include flame, plasma or corona discharge treatment to improve printability or adhesion.

By having at least one nonvoided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The structure of a preferred biaxially oriented sheet utilized with the vacuous core of the invention where the exposed surface layer is adjacent to the imaging layer is as follows:

| |
|---|
| polyethylene exposed surface layer |
| polypropylene layer |
| polyproplyene microvoided layer |
| polypropylene bottom layer |

The backside vacuous polymer base utilized in the imaging member of the invention is white and opaque without the addition of white pigments and therefore provides a pleasing support that is high in stiffness, white, opaque and is inexpensive. It was surprisingly found that the vacuous polymer base of this invention was superior in opacity and lighter in color than conventional photographic resin coated paper.

Addenda may be added to the vacuous backside polymer base to improve the whiteness of these sheets. This would include any process which is known in the art including adding a white pigment, such as titanium dioxide, barium sulfate, clay, or calcium carbonate. This would also include adding fluorescing agents which absorb energy in the ultraviolet region and emit light largely in the blue region, or other additives which would improve the physical properties of the sheet or the manufacturability of the sheet.

According to the present invention a process useful for the production of a vacuous polymer base comprises a blend of particles of a linear polyester with from 10 to 40% by weight of particles of a homopolymer or copolymer of polyolefin, extruding the blend as a film, quenching and biaxially orienting the film by stretching it in mutually perpendicular directions, and heat setting the film. Preferred amount of polyolefin is between 40 and 50% of the total polymer weight of the vacuous layer as this gives a low cost and low density layer. The preferred polyolefin is propylene as it is low in cost and successfully blends with the polyester for extrusion.

The opacity of the resulting vacuous polymer base arises through voiding which occurs between the regions of the linear polyester and the polyolefin polymer during the stretching operation. The linear polyester component of the vacuous polymer base may consist of any thermoplastic film forming polyester which may be produced by condensing one or more dicarboxylic acids or alower alkyl diester thereof, e.g. terephthalic acid, isophthalic, phthalic, 2,5-, 2,6- or 2,7-naphthalene dicarboxylic acid, succinic acid, sebacic acid, adipic acid, azelaic acid, bibenzoic acid, and hexahydroterephthalic acid, or bis-p-carboxy phenoxy ethane, with one or more glycols, e.g. ethylene glycol, 1,3-propanediol, 1-4-butanediol, neopentyl glycol and 1,4-cyclohexanedimethanol. It is to be understood that a copolyester of any of the above materials may be used. The preferred polyester is polyethylene terephthalate.

The preferred polyolefin additive which is blended with the polyester is a homopolymer or copolymer of propylene. Generally a homopolymer produces adequate opacity in the vacuous polymer and it is preferred to use homopolypropylene. An amount of 10 to 40% by weight of polyolefin additive, based on the total weight of the blend, is used. Amounts less than 10% by weight do not produce an adequate opacifying effect. Increasing the amount of polyolefin additive causes the tensile properties, such as tensile yield and break strength, modulus and elongation to break, to deteriorate and it has been found that amounts generally exceeding about 40% by weight can lead to film splitting during production. Satisfactory opacifying and tensile properties can be obtained with up to 35% by weight of polyolefin additive.

The polyolefin additive used according to this invention is incompatible with the polyester component of the vacuous polymer base and exists in the form of discrete globules dispersed throughout the oriented and heat set vacuous polymer base. The opacity of the vacuous polymer base is produced by voiding which occurs between the additive globules and the polyester when the vacuous polymer base is stretched. It has been discovered that the polymeric additive must be blended with the linear polyester prior to extrusion through the film forming die by a process which results in a loosely blended mixture and does not develop an intimate bond between the polyester and the polyolefin additive.

Such a blending operation preserves the incompatibility of the components and leads to voiding when the vacuous polymer base is stretched. A process of dry blending the polyester and polyolefin additive has been found to be useful. For instance, blending may be accomplished by mixing finely divided, e.g. powdered or granular, polyester and polymeric additive and, thoroughly mixing them together, e.g. by tumbling them. The resulting mixture is then fed to the film forming extruder. Blended polyester and polymeric additive which has been extruded and, e.g. reduced to a granulated form, can be successfully re-extruded into a vacuous opaque voided film (vacuous polymer base). It is thus possible to re-feed scrap film, e.g. as edge trimmings, through the process. Alternatively, blending may be effected by combining melt streams of polyester and the polyolefin additive just prior to extrusion. If the polymeric additive is added to the polymerisation vessel in which the linear polyester is produced, it has been found that voiding and hence opacity is not developed during stretching. This is thought to be on account of some form of chemical or physical bonding which may arise between the additive and polyester during thermal processing.

The extrusion, quenching and stretching of the vacuous polymer base may be effected by any process which is known in the art for producing oriented polyester film, e.g. by a flat film process or a bubble or tubular process. The flat film process is preferred for making vacuous polymer base according to this invention and involves extruding the blend through a slit die and rapidly quenching the extruded web upon a chilled casting drum so that the polyester component of the film is quenched into the amorphous state. The film base is then biaxially oriented by stretching in mutually perpendicular directions at a temperature above the glass-rubber transition temperature of the polyester. Generally the film is stretched in one direction first and then in the second direction although stretching may be effected in both directions simultaneously if desired. In a typical process the film is stretched firstly in the direction of extrusion over a set of rotating rollers or between two pairs of nip rollers and is then stretched in the direction transverse thereto by means of a tenter apparatus. The film may be stretched in each direction to 2.5 to 4.5 times its original dimension in the direction of stretching. After the film has been stretched and a vacuous polymer base formed, it is heat set by heating to a temperature sufficient to crystallise the polyester whilst restraining the vacuous polymer base against retraction in both directions of stretching. The voiding tends to collapse as the heat setting temperature is increased and the degree of collapse increases as the temperature increases. Hence the light transmission increases with an increase in heat setting temperatures. Whilst heat setting temperatures up to about 230 C. can be used without destroying the voids, temperatures below 200 C. generally result in a greater degree of voiding and higher opacity.

The opacity as determined by the total luminous transmission of a vacuous polymer base depends upon the thickness of the vacuous polymer base. Thus the stretched and heat set vacuous polymer base made according to this invention have a total luminous transmission not exceeding 25%, preferably not exceeding 20%, for vacuous polymer base having a thickness of at least 100 micrometers, when measured by ASTM test method D-1003-61. vacuous polymer base of thickness 50 to 99 micrometers have a total luminous transmission generally up to 30%. The invention also therefore relates to opaque biaxially oriented and heat set vacuous polymer bases produced from a blend of a linear polyester and from 10 to 40% by weight of a homopolymer or copolymer of ethylene or propylene and having a total luminous transmission of up to 30%. Such vacuous polymer bases may be made by the process specified above. The globules of polymeric additive distributed throughout the film produced according to this invention are generally 5 to 50 micrometer in diameter and the voids surrounding the globules 3 to 4 times the actual diameter of the globules. It has been found that the voiding tends to collapse when the void size is of the order of the vacuous polymer base thickness. Such vacuous polymer base therefore tends to exhibit poor opacity because of the smaller number of void surfaces at which light scattering can occur. Accordingly it is therefore preferred that the vacuous polymer base of this invention should have a thickness of at least 25 microns. vacuous polymer base thicknesses of between 100 and 250 micrometers are convenient for most end uses. Because of the voiding, the vacuous polymer bases with a density of less than 0.7 gm/cc lighter in weight, and more resilient than those bases with higher densities. The vacuous polymer bases may contain any compatible additive, such as pigments. Thus a light reflecting pigment, such as titanium dioxide, may be incorporated to improve the appearance and whiteness of the vacuous polymer bases. The vacuous polymer base may be used in any of the applications for which polyethylene terephthalate is used, except of course those where a high degree of transparency is required.

The vacuous polyester composite polymer bases of this invention exhibit a remarkable paper-like texture and are therefore suitable for use as a paper substitute, in particular as a base for photographic prints, i.e. as a substitute for photographic printing paper.

The quenching, orienting, and heat setting of vacuous polymer base may be effected by any process which is known in the art for producing oriented sheet, such as by a flat sheet process or a bubble or tubular process. The flat sheet process involves extruding or coextruding the blend through a slit die and rapidly quenching the extruded or coextruded web upon a chilled casting drum so that the polymer component(s) of the sheet are quenched below their solidification temperature. The quenched sheet is then biaxially oriented by stretching in mutually perpendicular directions at a temperature above the glass transition temperature of the polymer(s). The sheet may be stretched in one direction and then in a second direction or may be simultaneously stretched in both directions. After the sheet has been stretched, it is heat set by heating to a temperature sufficient to crystallize the polymers while restraining, to some degree, the sheet against retraction in both directions of stretching.

The vacuous polymer base may additional(y) have a topmost skin layer beneath the imaging layers or exposed surface layer that is between 0.20 μm and 1.5 μm, preferably between 0.5 and 1.0 μm thick. Below 0.5 μm any inherent non-planarity in the coextruded skin layer may result in unacceptable color variation. At skin thickness greater than 1.0 μm, there is little benefit in the photographic optical properties such as image resolution. At thickness greater that 1.0 μm , there is also a greater material volume to filter for contamination such as clumps, poor color pigment dispersion, or contamination. The skin material may include polyester and copolymers thereof as well as polyolefins and copolymer or blends thereof. Herein, where a density of the vacuous base is set forth as less than 0.7 g/cc, 0.2 up to 0.7 g/cc or 0.4 to 0.6 g/cc it is a reference only to the vacuous layer and not any skin layers that are attached or integral with the vacuous layer.

Addenda may be added to the topmost skin layer to change the color of the imaging element. For photographic use, a white base with a slight bluish tinge is preferred. The addition of the slight bluish tinge may be accomplished by any process which is known in the art including the machine blending of color concentrate prior to extrusion and the melt extrusion of blue colorants that have been preblended at the desired blend ratio. Colored pigments that can resist extrusion temperatures greater than 275° C. are preferred, as temperatures greater than 275° C. are necessary for coextrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments, Irgalite organic blue pigments, and pigment Blue 60.

The imaging member of this invention has vacuous polymer base with a density of less than 0.7 grams/cc and a modulus to density ratio of between 1500 and 4,000 which is adhered to a transparent polymer base that has an image. The preferred modulus to density range of the vacuous polymer base is between 2,000 and 3600. Below 2,000 the vacuous polymer base is weak and does not provide sufficient strength or bending resistant and in general feels limp. Above 4,000 the vacuous polymer base is not sufficiently opaque for viewing imaging without show through. Additional vacuous base above 3600 are more expensive.

In the formation of the imaging member of this invention it is preferred that the vacuous polymer base has a stiffness of between 50 and 300 millinewtons. Below 50 millinewtons that imaging member does not feel substantial enough to provide the viewer with a sense of worth. While imaging member above 300 millinewtons are sufficiently stiff, the added cost provides little or no benefit. Additional excessive stiff imaging member are more difficult for the end use to handle and are not sufficiently plyable to use is albums. Imaging members above 300 millinewtons tend to become very thick and are difficult to place in picture frames.

The vacuous polymer base useful in the imaging element of this invention is a composite of polyolefin and polyester having a ratio of polyester to polyolefin of between 5:1 and 11:9 by weight. Ratios above 5:1 does not void properly and tend to be low in opacity and high in density while ratios below 11:9 are not robust in manufacturing due to tear outs during stretching resulting in very low yields.

The preferred vacuous polymer base useful in the imaging element of this invention is a composite blend of polyolefin and polyester having a ratio of polyester to polyolefin of between 4:1 and 13:7 by weight. Ratios above 4:1 are more polyester like and are more difficult to void while ratios below 13:7 are harder to control for voiding and generally require tight control of the process conditions.

In the formation of imaging elements of this invention it is highly desirable to have a vacuous polymer base that has a L* of greater than 93. L* greater than 93 are much lighter and genrerally whiter appearing and therefore are more pleasing to the viewer. Below 93 the vacuous base is dark appearing and do not provide bright appearing colors.

The preferred imaging member of this invention has a vacuous polymer base that has a spectral transmission of less than 10%. Vacuous bases with transmissions of less than 10% provide sufficient opacity to minimize show through. If print have writing or back logos on the backside of the print, base with low opacity will have show through and interfere with the image. In such cases the viewer preceives this prints to be low in quality and low in value.

In the formation of the imaging member of this invention it is preferred to adhere a base to the image. One means of achieving this is to provide a vacuous polymer base with an adhesion layer on the surface adjacent said image. This provides a quick and convenient means of attaching the vacuous polymer base to the formed image. Having the adhesive on the vacuous polymer base does not interfere with the image formation and in the case of a photographic image that requires chemical process the adhesive does not contaminate the process chemicals.

In the present the vacuous polymer base is provided with an integral skin layer adapted for adhesion to said image. Such a layer is desirable for quick attachment to the image. Furthermore the integral layer may have a polymer having a Tg of less than 60° C. Polymers with a Tg less than 60° C. provide a surface and material that more readily attaches to the image. It is preferred to have a polymer having a Tg of between 45 and 55° C. Polymers below 45° C. tend to soften too quickly and are difficult to work with while polymers above 55° C. require more effort to soften and adhere to the image.

In a preferred embodiment of invention he imaging member has a vacuous polymer base that has a conductive surface. Providing a conductive layer helps to minimize static buildup. Minimizing static buildup helps to prevent the sheets from sticking together due to static cling. Furthermore static buildup attracts dirt which can create problems when adhering the vacuous polymer base to the imaged transparent polymer sheet. Dirt between the base and imaged sheet creates an undesirable and objectionable print. In another preferred embodiment of this invention the vacuous polymer base has an integrally extruded conductive skin layer. An integral extruded layer is desirable because the vacuous base can be made in a one step operation that is lower in cost but also minimizes the opportunity of the base from being scratched.

In a further embodiment of this invention the imaging member, the vacuous polymer base is provided with a polyester skin layer. A polyester skin is desirable to provide a smoother surface than achievable with the blend of two polymers. In the preferred embodiment said vacuous polymer base has a surface in contact with said image having a roughness of less than 0.2 micrometers. This is beneficial in obtaining better adhesion between the top surface of the vacuous polymer base and the image layer. Such a smooth surface also minimizes any surface non-uniformities that may detract from the print appearance. In a further embodiment said the imaging member has vacuous polymer base has a surface in contact with said image having a roughness of between 0.09 and 0.20 micrometers. Above 2.0 micrometers the surface formed may interfere with print viewing while below 0.09 micrometers air bubbles may become a problems when adhere the imaged transparent sheet and the vacuous polymer sheet together.

In a preferred imaging member of this invention the vacuous polymer base has a surface roughness on the side of said vacuous polymer base opposite to said image of between 0.25 and 2.0 micrometers. In most imaging print materials it is desirable to have a degree of roughness. Below 0.25 micrometers the outer most back surface is too smooth and does not have a print like feel to it. Furthermore if the surface is too smooth, it is prone to scratching and may also cause problems in conveyance during the process of joining the top imaged transparent polymer layer and the vacuous polymer base. Above 2.0 micrometers the surface has excessive roughness that may cause damage to the final assembled imaging member. In another embodiment of this invention the roughness of between 0.25 and 2.0 may be obtained without the use of additive particles. This may be achieved by embossing a pattern into the surface of the backside or by melt coating the backside surface with a layer of polymer that is extruded onto the vacuous polymer base by bring the base and molten resin together in a nip of two rollers that is under mechanical pressure. One of the rollers is preferable a chill roll that has a roughened surface that replicates its surface into the resin that was extruded onto the base. An additional means of providing the desired roughness is to laminate a sheet to the backside surface that has the desired roughness. This preferable a polymer sheet but may also be paper or cloth.

In yet another embodiment of this invention said vacuous polymer base further comprises white pigment. White pigment is useful in providing additional opacity particular when thin vacuous polymer bases are used or where the amount of voiding is not sufficient to prevent show through by itself. White pigment is also useful in providing additional whiteness to the imaging member. Any white pigment known in the art may be use such as TiO2, BaSO4, CaCO3, clays, talc, and others.

When making imaged print materials it is also desirable to mark or otherwise record or write on the imaging materials. In a further embodiment the imaging member in which the vacuous polymer base whose side opposite the image further comprises a surface layer of a low Tg polymer having a Tg of less than 60° C. and has indicia embossed thereon. This is useful in being able to record information about the print on the print surface.

In a further embodiment said vacuous polymer base may comprises a magnetic recordable layer integral with said vacuous polymer base on the side opposite said image. Magnetic recording layer are useful in capturing digital information about the processing or printing condition of the print as well as the exposure information when the image was capture or where the image came from.

In the area of commercial display it is desirable to provide imaged materials that are fire retardant in order to meet fire code. In an embodiment of this invention the imaging member comprising a vacuous polymer base further comprises a fire retardant material.

Materials and means of providing the vacuous polymer base of this invention with fire retardant properties include at least one fire retardant material selected from the group consisting of phosphoric acid esters, aryl phosphates and their alkyl substituted derivatives, phosphorinanes, antimony trioxide, aluminum hydroxide, boron-containing compounds, chlorinated hydrocarbons, chlorinated cycloaliphatics, aromatically bond bromine compounds and halogen-containing materials. These materials may be useful in providing a vacuous polymer base that is more resistant to flame than other plastic or paper bases. Since these imaging members may be used for display purposes, it is beneficial to have display that meet strict new fire codes. The phosphoric acid esters and in particular phosphorinanes are preferred because it may be added to the polymer base resin with minimal coloration effect to the polymer base.

Since the vacuous polymer base of this invention has high opacity, the imaging member that is formed with a transparent polymer sheet with an image may be adhered to both sides of said vacuous sheet. In this embodiment a single sheet of vacuous base is needed to display two-images. This is useful for album pages. The image that is adhered to the polymer base may be further wrapped around an edge of the vacuous polymer base. This is useful in the production of print material. Two or more images may be made or developed on the transparent polymer sheet that is then adhered to the vacuous core. The imaged transparent polymer base is wrapped around at least one edge of the vacuous core base. This is a cost effective means of making imaging member. In a further embodiment of this invention the imaging member is provided with a means to aid in the insertion into an album. The most preferred means of this embodiment is provide holes. Holes are useful for use in ring binders or with use of spiral fasteners. Any means know in the art of binding or otherwise holding two or more sheets together may be used.

An additional embodiment of this invention comprises an imaging member with a vacuous polymer base that is provided on each side with an integral skin layer adapted for adhesion to said image. The integral skin layer may have a polymer having a Tg of less than 60° C. Polymers with a Tg less than 60° C. are desirable because they generally may be adapted for adhesion more easily. Any polymer known in the art may be used provided that when it is adapted it provides an adhesive force between the transparent polymer sheet with an image to the vacuous core base. Some useful polymers include pressure sensitive adhesives, thermal sensitive polymers whose adhesive properties are activated by the application of heat and or pressure. This may also include encapsulated materials that when pressure is applied, the capsule is broken and an adhesive bond is formed. An additional means of forming the imaging member is to insert a sheet of material between the transparent polymer sheet with the image and the vacuous core base. When heat and or pressure is applied an adhesive force is formed to hold the said transparent polymer sheet and vacuous core base together.

In the formation of imaging members it is often desirable to record information with the image. In one embodiment of this invention the imaging member with the vacuous polymer base is further provided with an ink jet receiving layer on the side of said vacuous polymer base opposite to said image. Having an ink jet receiving layer on the backside of the imaging member is useful to record information about the image or even to provide an inkjet formed image on the backside. In a further embodiment of this invention said ink jet receiving layer may comprise a voided polyester. In this embodiment the voided polyester is an open cell layer that is capable of accepting ink. Such a ink jet receiving layer is useful because it may be formed integrally with the vacuous polymer base and therefore not require a separate manufacturing step to apply it to vacuous polymer base.

When using a polyester base, it is preferable to extrusion laminate the microvoided composite sheets to the base polymer using a polyolefin resin. Extrusion laminating is carried out by bringing together the biaxially oriented sheets of the invention and the polyester base with application of an melt extruded adhesive between the polyester sheets and the biaxially oriented polyolefin sheets followed by their being pressed in a nip such as between two rollers. The melt extruded adhesive may be applied to either the biaxially oriented sheets or the base polymer prior to their being brought into the nip. In a preferred form the adhesive is applied into the nip simultaneously with the biaxially oriented sheets and the base polymer. The adhesive used to adhere the biaxially oriented polyolefin sheet to the polyester base may be any suitable material that does not have a harmful effect upon the photographic element. A preferred material is metallocene catalyzed ethylene plastomers that are melt extruded into the nip between the polymer and the biaxially oriented sheet. Metallocene catalyzed ethylene plastomers are preferred because they are easily melt extruded, adhere well to biaxially oriented polyolefin sheets of this invention and adhere well to gelatin sub coated polyester support of this invention.

The preferred stiffness of the laminated transparent polymer base of this invention is between 60 and 500 millinewtons. At stiffness less than 50 millinewtons, the support becomes difficult to convey through photoprocessing machines. At stiffness greater than 650 millinewtons, the support becomes too stiff to bend over transport rollers during manufacturing and photoprocessing. Further, an increase in stiffness beyond 650 millinewtons does not significantly benefit the consumer, so the increased cost to provide materials with stiffness greater than 650 millinewtons is not justified.

The structure of a preferred display support where the imaging layers are applied to the biaxially oriented polyolefin sheet is as follows:

| |
|---|
| Biaxially oriented, microvoided polyolefin sheet |
| Metallocene catalyzed ethylene plastomer |
| Vacuous polyester base (with voiding agent polypropylene) |

Used herein, the phrase 'imaging element' comprises an imaging support as described above, along with an image receiving layer as applicable to multiple techniques governing the transfer of an image onto the imaging element. Such techniques include thermal dye transfer, electrophotographic printing, or ink jet printing, as well as a support for photographic silver halide images. As used herein, the phrase "photographic element" is a material that utilizes photosensitive silver halide in the formation of images.

The thermal dye image-receiving layer of the receiving elements of the invention may comprise, for example, a polycarbonate, a polyurethane, a polyester, polyvinyl chloride, poly(styrene-co-acrylonitrile), poly(caprolactone), or mixtures thereof. The dye image-receiving layer may be present in any amount that is effective for the intended purpose. In general, good results have been obtained at a concentration of from about 1 to about 10 $g/m^2$. An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention, provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803; and 5,023,228. As noted above, dye-donor elements are used to form a dye transfer image. Such a process comprises image-wise-heating a dye-donor element and transferring a dye image to a dye-receiving element as described above to form the dye transfer image. In a preferred embodiment of the thermal dye transfer method of printing, a dye donor element is employed which compromises a poly(ethylene terephthalate) support coated with sequential repeating areas of cyan, magenta, and yellow dye, and the dye transfer steps are sequentially performed for each color to obtain a three-color dye transfer image. When the process is only performed for a single color, then a monochrome dye transfer image is obtained.

Thermal printing heads, which can be used to transfer dye from dye-donor elements to receiving elements of the invention, are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in the prior art. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form, the electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed, to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

When used as ink jet imaging media, the recording elements or media typically comprise a substrate or a support material having on at least one surface thereof an ink-receiving or image-forming layer. If desired, in order to improve the adhesion of the ink receiving layer to the support, the surface of the support may be corona-discharge-treated prior to applying the solvent-absorbing layer to the support or, alternatively, an undercoating, such as a layer formed from a halogenated phenol or a partially hydrolyzed vinyl chloride-vinyl acetate copolymer, can be applied to the surface of the support. The ink receiving layer is preferably coated onto the support layer from water or water-alcohol solutions at a dry thickness ranging from 3 to 75 micrometers, preferably 8 to 50 micrometers.

Any known ink jet receiver layer can be used in combination with the external polyester-based barrier layer of the present invention. For example, the ink receiving layer may consist primarily of inorganic oxide particles such as silicas, modified silicas, clays, aluminas, fusible beads such as beads comprised of thermoplastic or thermosetting polymers, non-fusible organic beads, or hydrophilic polymers such as naturally-occurring hydrophilic colloids and gums such as gelatin, albumin, guar, xantham, acacia, chitosan, starches and their derivatives, and the like; derivatives of natural polymers such as functionalized proteins, functionalized gums and starches, and cellulose ethers and their derivatives; and synthetic polymers such as polyvinyloxazoline, polyvinylmethyloxazoline, polyoxides, polyethers, poly(ethylene imine), poly(acrylic acid), poly(methacrylic acid), n-vinyl amides including polyacrylamide and polyvinylpyrrolidone, and poly(vinyl alcohol), its derivatives and copolymers; and combinations of these materials. Hydrophilic polymers, inorganic oxide particles, and organic beads may be present in one or more layers on the substrate and in various combinations within a layer.

A porous structure may be introduced into ink receiving layers comprised of hydrophilic polymers by the addition of ceramic or hard polymeric particulates, by foaming or blowing during coating, or by inducing phase separation in the layer through introduction of non-solvent. In general, it is preferred for the base layer to be hydrophilic, but not porous. This is especially true for photographic quality prints, in which porosity may cause a loss in gloss. In particular, the ink receiving layer may consist of any hydrophilic polymer or combination of polymers with or without additives as is well known in the art.

If desired, the ink receiving layer can be overcoated with an ink-permeable, anti-tack protective layer, such as, for example, a layer comprising a cellulose derivative or a cationically-modified cellulose derivative or mixtures thereof. An especially preferred overcoat is poly β-1,4-anhydro-glucose-g-oxyethylene-g-(2'-hydroxypropyl)-N, N-d imethyl-N-dodecylammonium chloride. The overcoat layer is non porous, but is ink permeable and serves to improve the optical density of the images printed on the element with water-based inks. The overcoat layer can also protect the ink receiving layer from abrasion, smudging, and water damage. In general, this overcoat layer may be present at a dry thickness of about 0.1 to about 5 μm, preferably about 0.25 to about 3 μm.

In practice, various additives may be employed in the ink receiving layer and overcoat. These additives include surface active agents such as surfactant(s) to improve coatability and to adjust the surface tension of the dried coating, acid or base to control the pH, antistatic agents, suspending agents, antioxidants, hardening agents to cross-link the coating, antioxidants, UV stabilizers, light stabilizers, and the like. In addition, a mordant may be added in small quantities (2%-10% by weight of the base layer) to improve waterfastness. Useful mordants are disclosed in U.S. Pat. No. 5,474,843.

The layers described above, including the ink receiving layer and the overcoat layer, may be coated by conventional coating means onto a transparent or opaque support material commonly used in this art. Coating methods may include, but are not limited to, blade coating, wound wire rod coating, slot coating, slide hopper coating, gravure, curtain coating, and the like. Some of these methods allow for simultaneous coatings of both layers, which is preferred from a manufacturing economic perspective.

The DRL (dye receiving layer) is coated over the tie layer or TL at a thickness ranging from 0.1-10 μm, preferably 0.5-5 μm. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al in U.S. Pat. Nos. 4,879,166; 5,264,275; 5,104,730; 4,879,166, and Japanese Patents 1,095,091; 2,276,671; 2,276,670; 4,267,180; 5,024,335; and 5,016,517 disclose aqueous based DRL formulations comprising mixtures of psuedo-bohemite and certain water soluble resins. Light in U.S. Pat. Nos. 4,903,040; 4,930,041; 5,084,338; 5,126,194; 5,126,195; and 5,147,717 disclose aqueous-based DRL formulations comprising mixtures of vinyl pyrrolidone polymers and certain water-dispersible and/or water-soluble polyesters, along with other polymers and addenda. Butters et al in U.S. Pat. Nos. 4,857,386 and 5,102,717 disclose ink-absorbent resin layers comprising mixtures of vinyl pyrrolidone polymers and acrylic or methacrylic polymers. Sato et al in U.S. Pat. No. 5,194,317 and Higuma et al in U.S. Pat. No. 5,059,983 disclose aqueous-coatable DRL formulations based on poly(vinyl alcohol). Iqbal in U.S. Pat. No. 5,208,092 discloses water-based IRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is 0.1-10 micrometers thick and is coated as an aqueous dispersion of 5 parts alumoxane and 5 parts poly(vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118; 5,027,131; and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Smooth opaque bases are useful in combination with silver halide images because the contrast range of the silver halide image is improved and show through of ambient light during image viewing is reduced. The photographic element of this invention is directed to a silver halide photographic element capable of excellent performance when exposed by either an electronic printing method or a conventional optical printing method. An electronic printing method comprises subjecting a radiation sensitive silver halide emulsion layer of a recording element to actinic radiation of at least $10^{-4}$ ergs/$cm^2$ for up to 100μseconds duration in a pixel-by-pixel mode wherein the silver halide emulsion layer is comprised of silver halide grains is also suitable. A conventional optical printing method comprises subjecting a radiation sensitive silver halide emulsion layer of a recording element to actinic radiation of at least $10^{-4}$ ergs/$cm^2$ for $10^{-3}$ to 300 seconds in an imagewise mode wherein the silver halide emulsion layer is comprised of silver halide grains as described above. This invention in a preferred embodiment utilizes a radiation-sensitive emulsion comprised of silver halide grains (a) containing greater than 50 mole percent chloride based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula:

$$[ML_6]^n \qquad (I)$$

wherein n is zero, −1, −2, −3, or −4; M is a filled frontier orbital polyvalent metal ion, other than iridium; and $L_6$ represents bridging ligands which can be independently selected, provided that at least four of the ligands are anionic ligands, and at least one of the ligands is a cyano ligand or a ligand more electronegative than a cyano ligand; and (ii) an iridium coordination complex containing a thiazole or substituted thiazole ligand. Preferred photographic imaging layer structures are described in EP Publication 1 048 977.

The photosensitive imaging layers described therein provide particularly desirable images on the base of this invention.

The following examples illustrate the practice of this invention. They are not intended to be exhaustive of all possible variations of the invention. Parts and percentages are by weight unless otherwise indicated.

EXAMPLES

Example 1

In this example vacuous polyester of the invention was laminated on the top and bottom side with biaxially oriented polyolefin sheets as a base for light sensitive silver halide imaging layers. The invention material was compared to a prior art reflective display material comprising a solid polyester base. Kodak Duraflex (Eastman Kodak Co.), is a one side color silver halide coated polyester support (256 micrometers thick) containing $BaSO_4$ and optical brightener was used as the comparison for the invention. This example will show the weight, imaging and mechanical advantages of a vacuous base compared to a solid polymer base.

The following laminated photographic display material of the invention was prepared by extrusion laminating the following sheet to top side of a photographic grade vacuous polyester base.

Top Sheet (Emulsion Side):

A composite sheet consisting of 5 layers identified as L1, L2, L3, L4, L5. L1 is the thin colored layer on the outside of the package to which the photosensitive silver halide layer was attached. L2 is the layer to which optical brightener and $TiO_2$ was added. The optical brightener used was Hostalux KS manufactured by Ciba-Geigy. The rutile $TiO_2$ used was DuPont R104 (a 0.22 micrometer particle size $TiO_2$). Table 1 below lists the characteristics of the layers of the top biaxially oriented sheet used in this example.

TABLE 1

| Layer | Material | Thickness, microns |
|---|---|---|
| L1 | LD Polyethylene + color concentrate | 0.75 |
| L2 | Polypropylene + 18% TIO2 | 4.32 |
| L3 | Voided Polypropylene | 24.9 |
| L4 | Polypropylene | 4.32 |
| L5 | Polypropylene | 0.762 |
| L6 | LD Polyethylene | 11.4 |

Bottom Biaxially Oriented Polyolefin Sheet (Backside Side):

The bottom biaxially oriented sheet laminated to the backside of invention base was a one-side matte finish, one-side treated biaxially oriented polypropylene sheet (25.6 μm thick) (d=0.90 g/cc) consisting of a solid oriented polypropylene layer and a skin layer of a mixture of polyethylenes and a terpolymer comprising ethylene, propylene, and butylene. The skin layer was on the bottom and the polypropylene layer and laminated to the paper.

Vacuous Polymer Base:

The production of a vacuous opaque oriented polyester polymer base was a blend of particles of a linear polyester (PET) with 25% by volume of particles of a homopolymer polyolefin (polypropylene), extruding the blend as a polymer film, quenching and biaxially orienting the film by stretching it in mutually perpendicular directions, and heat setting the vacuous polymer base. Then PET(#7352 from Eastman Chemicals) was dry blended with Polypropylene("PP", Huntsman P4G2Z-073AX) at 20% by weight and with 5% by weight of a 1 part PET to 1 part TiO2 concentrate (PET 9663 E0002 from Eastman Chemicals). This blend was then dried in a desiccant dryer at 65 C. for 12 hours. Cast sheets were extruded using a 2-½" extruder to extrude the PET/PP/TiO2 blend. The 275C meltstream was fed into a 7 inch film extrusion die also heated at 275 C. As the extruded sheet emerged from the die, it was cast onto a quenching roll set at 55C. The PP in the PET matrix dispersed into globules between 10 and 30 um's in size during extrusion. The final dimensions of the continuous cast sheet were 18 cm wide and 1250 um's thick. The cast sheet was then stretched at 110 C first 3.2 times in the X-direction and then 3.4 times in the Y-direction. The stretched sheet was then Heat Set at 150 C. During stretching voids were initiated around the particles of PP that were dispersed in the cast sheet. These voids grew during stretching and resulted in significant void volume. The resulting density of the stretched vacuous polymer base was 0.6 gm/cc and the thickness was micrometer.

The top sheet used in this example was coextruded and biaxially oriented. The top sheet was melt extrusion laminated to the polyester base using an metallocene catalyzed ethylene plastomer (SLP 9088) manufactured by Exxon Chemical Corp. The metallocene catalyzed ethylene plastomer had a density of 0.900 g/cc and a melt index of 14.0. The L3 layer for the biaxially oriented sheet is microvoided with polypropylene beads in an amount of about 2% by weight.

Typical light sensitive silver halide imaging layers such as those disclosed in EP Publication 1 048 977 was utilized to prepare photographic reflective display material and was coated on the L1 polyethylene layer on the top biaxially oriented sheet of the invention and the control material.

The structure of the invention material was as follows;

| |
|---|
| Light sensitive silver halide imaging layers |
| Top biaxially oriented polymer sheet |
| SLP 9088 - plastomer |
| Vacuous polyester core |
| SLP 9088 - plastomer |
| Bottom biaxially oriented sheet |

The bending stiffness of the polyester base and the laminated display material support was measured by using the Lorentzen and Wettre stiffness tester, Model 16D. The output from is instrument is force, in millinewtons, required to bend the cantilevered, unclasped end of a sample 20 mm long and 38.1 mm wide at an angle of 15 degrees from the unloaded position. In this test the stiffness in both the machine direction and cross direction of the polyester base was compared to the stiffness of the base laminated with the top biaxially oriented sheet of this example. The results are presented in Table 3.

TABLE 3

| | Machine Direction Stiffness (millinewtons) | Cross Direction Stiffness (millinewtons) |
|---|---|---|
| Before Lamination | 65 | 54 |

TABLE 3-continued

| | Machine Direction Stiffness (millinewtons) | Cross Direction Stiffness (millinewtons) |
|---|---|---|
| After Lamination | 157 | 143 |

The data above in Table 3 shows the significant increase in stiffness of the vacuous polyester base after lamination with a biaxially oriented polymer sheet. This result is significant in that prior art materials, in order to provide the necessary stiffness, used polyester bases that were much thicker (between 150 and 256 micrometers) compared to the 110 micrometer polyester base used in this example. At equilvant stiffness, the significant increase in stiffness after lamination allows for a thinner polyester base to be used compared to prior art materials thus reducing the cost of the reflective display support. Further, a reduction in reflective display material thickness allows for a reduction in material handling costs as rolls of thinner material weigh less and are smaller in roll diameter.

The display materials (both invention and control) were processed as a minimum density. The display support was measured for status A density using an X-Rite Model 310 photographic densitometer. Spectral transmission is calculated from the Status A density readings and is the ratio of the transmitted power to the incident power and is expressed as a percentage as follows; $T_{RGB}=10^{-D}*100$ where D is the average of the red, green and blue Status A transmission density response. The display materials were also measured for L*, a* and b* using a Spectrogard spectrophotometer, CIE system, using illuminant D6500. The comparison data for invention and control are listed in Table 4 below.

TABLE 4

| Measure | Invention | Prior Art Material |
|---|---|---|
| % Transmission | 0.8 | 2.6 |
| CIE D6500 L* | 94.5 | 95.6 |
| CIE D6500 a* | −0.84 | −0.82 |
| CIE D6500 b* | −2.51 | 2.2 |
| Thickness | 6 mil | 8.7 mil |

The reflective display support coated with the light sensitive silver halide coating format of this example exhibits all the properties needed for an photographic display material. While the control material is satisfactory as a reflective display material, the invention in this example has many advantages over prior art reflective display materials. The biaxially oriented polymer sheet of the invention had levels of $TiO_2$ and colorants adjusted to provide an improved minimum density position compared to the control as the invention was able to overcome the native yellowness of the processed emulsion layers (substantially blue b* of −2.51 for the invention compared to a yellow b* of 2.2 for the control). A neutral or slight blue minimum density has significant commercial value as consumers prefer a minimum density that has a slight blue tint.

The % transmission for the invention (0.8%) provides an ideal reflection images in that the backsideshow through for the invention materials is very low allowing the invention material to be utilized for commercial display were images are hung in convention centers or the invention material allow higher density back printing to be used without interfering with the quality of the image on the front side. Further, concentration of the tint materials and the white pigments in the biaxially oriented sheet allows for improved manufacturing efficiency and lower material utilization resulting in a lower cost display material. The a* and L* for the invention are consistent with a high quality reflective display materials. Finally the invention would be lower in cost over prior art materials as a 4.0 mil vacuous polyester base was used in the invention compared to a solid 8.7 mil polyester for the control.

While this example is directed toward silver halide consumer print and display materials and silver halide label materials, it is understood that other image printing technologies may be used to deliver a high quality image. Imaging technologies such as ink jet printing, thermal dye transfer printing and electrophotographic printing have been shown to deliver a high quality image consistent with the invent of the invention.

The invention has been described in detail with particular reference to preferred embodiments thereof, but it will be understood that variations and modifications can be effected within the spirit and scope of the invention.

What is claimed is:

1. An imaging member comprising an image layer and a base material wherein said base material comprises at least one oriented sheet laminated to a core sheet comprising a vacuous composite of polyolefin and polyester, wherein said core sheet density is between 0.4 and 0.6 g/cc, wherein said core sheet comprises polyester polymer between voids of a thickness of between 2 and 8 micrometers, and wherein said core sheet has an integral lower surface layer with a roughness of greater than 0.2 μm, wherein said core sheet has a ratio of polyester to polyolefin of between 5 to 1 and 11 to 9 by weight.

2. The imaging member of claim 1 wherein said core sheet has a ratio of polyester to polyolefin of between 4 to 1 and 13 to 7 by weight.

3. The imaging member of claim 1 wherein said core sheet comprises voids that have an aspect ratio of greater than 10:1.

4. The imaging member of claim 1 wherein said core sheet comprises voids that have a vertical height of between 2 and 8 micrometers.

5. The imaging member of claim 1 wherein said core sheet comprises voids such that said voids have a number of between 4 and 18 in the vertical direction per 25 μm of thickness of said sheet.

6. The imaging member of claim 1 wherein said oriented sheet is on the upper side of said core and said base further comprises an oriented sheet on the lower side of said core.

7. The imaging member of claim 6 wherein said oriented sheets comprise biaxially oriented polyolefin sheets.

8. The imaging member of claim 1 wherein said core sheet has an integral upper surface layer with a roughness of less than 0.1 μm.

9. The imaging member of claim 1 wherein said core sheet has an integral porous lower surface layer.

10. The imaging member of claim 1 wherein said image layer comprises at least one layer comprising photosensitive silver halide grains and dye forming coupler.

11. The imaging member of claim 1 wherein said base has a stiffness from 60 to 500 mN.

12. An imaging member comprising an image layer and a base material wherein said base material comprises at least one oriented sheet laminated to a core sheet comprising a vacuous composite of polyolefin and polyester, wherein said core sheet density is between 0.4 and 0.6 g/cc, wherein said core sheet comprises polyester polymer between voids of a thickness of between 2 and 8 micrometers, and wherein said core sheet has an integral porous lower surface layer wherein said core sheet has a ratio of polyester to polyolefin of between 5 to 1 and 11 to 9 by weight.

13. The imaging member of claim 12 wherein said core sheet has a ratio of polyester to polyolefin of between 4 to 1 and 13 to 7 by weight.

14. The imaging member of claim 12 wherein said core sheet comprises voids that have an aspect ratio of greater than 10:1.

15. The imaging member of claim 12 wherein said core sheet comprises voids such that said voids have a number of between 4 and 18 in the vertical direction per 25 μm of thickness of said sheet.

16. The imaging member of claim 12 wherein said oriented sheet is on the upper side of said core and said base further comprises an oriented sheet on the lower side of said core.

17. The imaging member of claim 12 wherein said core sheet has an integral upper surface layer with a roughness of less than 0.1 μm.

18. The imaging member of claim 12 wherein said image layer comprises at least one layer comprising photosensitive silver halide grains and dye forming coupler.

19. The imaging member of claim 12 wherein said base has a stiffness from 60 to 500 mN.

* * * * *